United States Patent
Leitner

(10) Patent No.: US 10,248,447 B2
(45) Date of Patent: Apr. 2, 2019

(54) PROVIDING LINK AGGREGATION AND HIGH AVAILABILITY THROUGH NETWORK VIRTUALIZATION LAYER

(71) Applicant: Red Hat, Inc., Raleigh, NC (US)

(72) Inventor: Flavio Leitner, Maringa (BR)

(73) Assignee: Red Hat, Inc., Raleigh, NC (US)

( * ) Notice: Subject to any disclaimer, the term of this patent is extended or adjusted under 35 U.S.C. 154(b) by 134 days.

(21) Appl. No.: 14/952,586

(22) Filed: Nov. 25, 2015

(65) Prior Publication Data

US 2017/0149653 A1 May 25, 2017

(51) Int. Cl.
*H04L 12/709* (2013.01)
*G06F 9/455* (2018.01)

(52) U.S. Cl.
CPC ........... *G06F 9/45558* (2013.01); *G06F 2009/45583* (2013.01); *G06F 2009/45595* (2013.01)

(58) Field of Classification Search
CPC . G06F 2009/45583; G06F 2009/45595; G06F 9/45558; H04L 45/245
See application file for complete search history.

(56) References Cited

U.S. PATENT DOCUMENTS

| | | | |
|---|---|---|---|
| 7,606,986 B1 | 10/2009 | Limaye et al. | |
| 8,032,780 B2 | 10/2011 | Koh et al. | |
| 8,117,495 B2 | 2/2012 | Graham et al. | |
| 8,479,294 B1 | 7/2013 | Li et al. | |
| 8,819,235 B2 | 8/2014 | Cardona et al. | |
| 8,874,954 B1 | 10/2014 | Gupte et al. | |
| 2012/0179922 A1* | 7/2012 | Mehrotra | G06F 1/3278 713/300 |
| 2013/0194914 A1* | 8/2013 | Agarwal | H04L 45/245 370/225 |
| 2014/0198656 A1 | 7/2014 | Venkatesh et al. | |

(Continued)

FOREIGN PATENT DOCUMENTS

| | | |
|---|---|---|
| CN | 103106126 A | 5/2013 |
| WO | 2013184141 A1 | 12/2013 |

OTHER PUBLICATIONS

Collier, Scott and Gautreau, Brian "Creating Fault-Tolerant Xen Virtualization at the Network Adapter Layer", Dell Power Solutions, Feb. 2007.

(Continued)

*Primary Examiner* — Awet Haile
(74) *Attorney, Agent, or Firm* — Lowenstein Sandler LLP

(57) ABSTRACT

A method relates to receiving, by a processing device of a host computer system executing a hypervisor, a network packet from a virtual port associated with a virtual machine managed by the hypervisor, generating a metadata item associated with the network packet, the metadata item comprising an identifier of the virtual port, recording the metadata item in a data structure identifying an address space of the hypervisor, determining, in view of the metadata item, a transmission mode to transmit the network packet, wherein the transmission mode is represented by at least one of a link aggregation mode or a high availability mode, identifying a network interface controller (NIC) of the host machine for processing the network packet according to the transmission mode, transmitting the network packet to the NIC.

20 Claims, 6 Drawing Sheets

(56) References Cited

U.S. PATENT DOCUMENTS

2014/0282524 A1* 9/2014 Abidi ................ G06F 9/45533
 718/1
2017/0054686 A1* 2/2017 Malkov ............... H04L 63/0272

OTHER PUBLICATIONS

"Configuring Link Aggregation, Chapter 10", Cisco, Cisco ONS 15454 and Cisco 15454 SDH Ethernet Card Software Feature and Configuration Guide, 14 Pages http://www.cisco.com/c/en/us/td/docs/optical/15000r8_0/ethernet/454/guide/d80ether/r8lnkag.pdf (Last accessed Jan. 6, 2016).

Dube, Eric and Khan, Rashid "New networking features & tools for Red Hat Enterprise Linux 7 beta", Red Hat, Inc., Red Hat Summit, San Franciso, CA, Apr. 14, 2017 77 Pages.

Jones, M. Tim "Virtio: An I/O virtualization framework for Linux", IBM, IBM developerWorks Premium, Jan. 29, 2010 7 Pages http://www.ibm.com/developerworks/library/I-virtio/.

* cited by examiner

PROVIDING LINK AGGREGATION AND HIGH AVAILABILITY THROUGH NETWORK VIRTUALIZATION LAYER

TECHNICAL FIELD

This disclosure relates to network virtualization, and in particular, to a system and method to provide link aggregation and high availability services via a network virtualization layer.

BACKGROUND

A virtual machine is a software implementation of a machine (e.g., a computer) that is capable of executing programs. Multiple virtual machines may run on one host machine. Each virtual machine may have its own operating system (referred to as a guest operating system). The virtual machines may acquire networking capabilities via networking resources (e.g., network interface controllers (NICs)) of the host machine.

BRIEF DESCRIPTION OF THE DRAWINGS

The present disclosure is illustrated by way of example, and not by way of limitation, in the figures of the accompanying drawings.

DETAILED DESCRIPTION

The acquired networking capabilities may include certain network functionality such as link aggregation (LA) and high availability (HA). Link aggregation (LA) allows the generation of a single logical channel by the bundling multiple physical ports, thus providing the network bandwidth which is higher than that of a single physical port. High availability (HA) provides a single logical interface for at least two physical links to at least two separate switches, thus providing link redundancy.

Since cloud providers usually do not have control over virtual machines, HA/LA services are implemented in host machines as a networking layer transparent to the virtual machines running on the host machines. Host machines can be computers running under different types of operating systems. Thus, provision of HA/LA services in host machines may require considerable customization efforts by system administrator. Current LA/HA solutions are not integrated and thus require system administrators to understand not only each LA/HA solution available, but also how to integrated with the network structure associated with a host machine. Thus, there is a need to improve over the current solutions to generate LA/HA capabilities.

Implementations of the present disclosure provide HA/LA services within the network virtualization layer, which is situated between virtual machines and a hypervisor running on the host machine. The network virtualization layer may include integrated components to allow configuration of LA/HA services, thus eliminating the need for an administrator to select among different offers and work on their integration with the network structure. Because the network virtualization layer contains the information relating to the virtual machine (VM) networking and the host machine networking, VMs may be deployed more efficiently using the network virtualization layer.

Figure 1A:
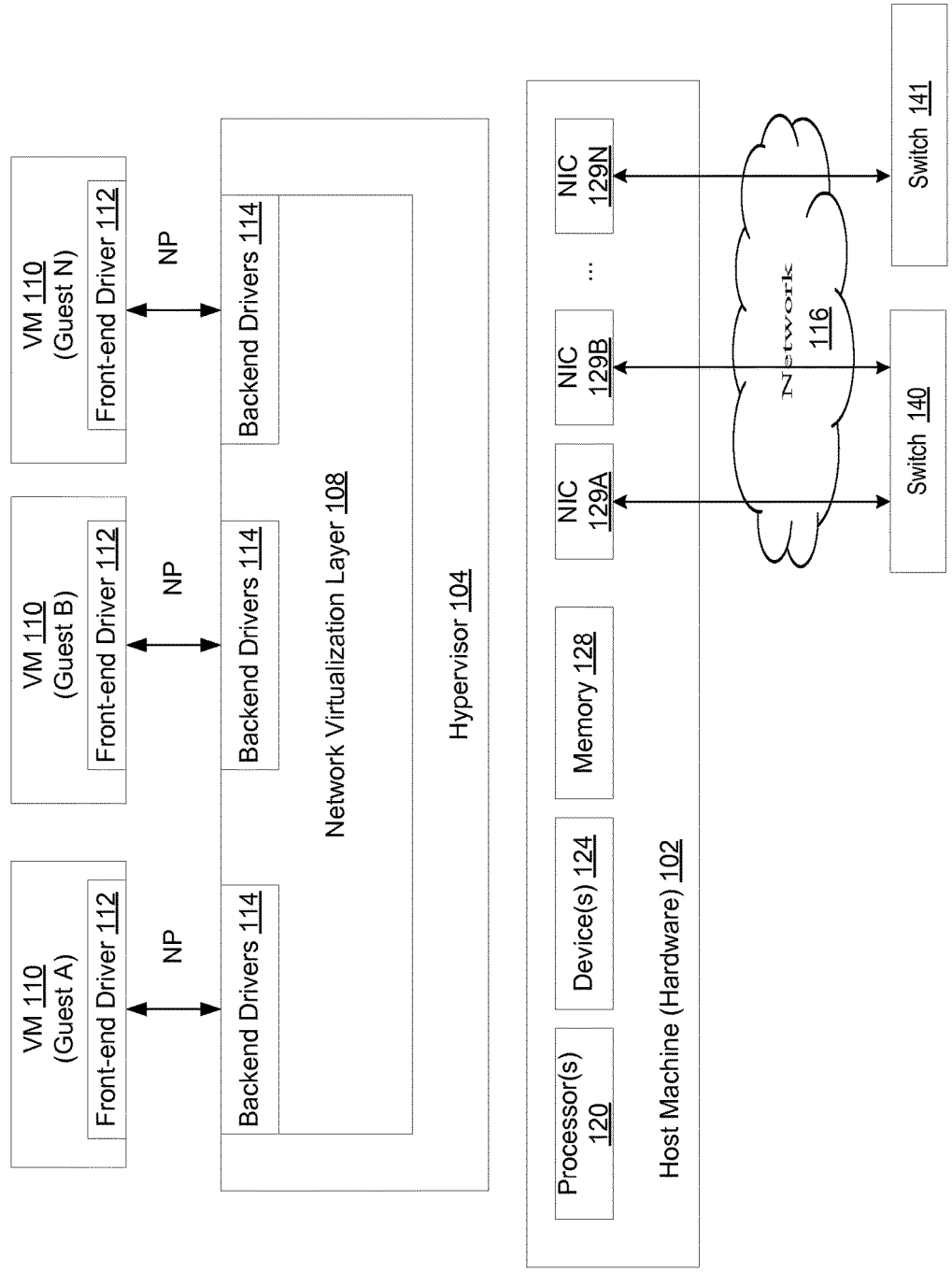
FIG. 1A is a block diagram that illustrates a system according to an implementation of the present disclosure.

FIG. 1A is a block diagram that illustrates a system 100 according to an implementation of the present disclosure. System 100 may be a rackmount server, a workstation, a desktop computer, a notebook computer, a tablet computer, a mobile phone, a compute node of a data center, etc. System 100 includes a host machine 102 which may further include one or more processors 120, one or more peripheral devices 124, memory 128, and multiple physical network interface controllers (NICs) 129A-129N. The memory 128 may include volatile memory devices (e.g., random access memory (RAM)), non-volatile memory devices (e.g., flash memory), and/or other types of memory devices. The host machine 102 may also be coupled to external storage (not shown) via a direct connection or a local network. System 100 may be a single machine or multiple machines which may be arranged in a cluster provided in a computing cloud. System 100 may also include a physical network that couples the host machine 102 to network devices such as switches 140, 141.

Peripheral devices 124 may be physical devices that are internal or external to host machine 102. Examples of internal devices may include graphics cards, hardware RAID controllers, secondary storage (e.g., hard disk drive, magnetic or optical storage based disks, tapes or hard drives), universal serial bus (USB) devices, and internal input/output (I/O) devices. Examples of external devices may include a keyboard, mouse, speaker, external hard drive, and external I/O devices.

NICs 129A-129N provide a hardware interface between host machine 102 and the physical network 116. NICs 129A-129N may support wired standards, wireless standards, or both. The NICs 129-133 may be Ethernet controllers, Wi-Fi controllers, Token Rings, Infiniband controllers, and so forth. NICs 129A-129N provide functionality to communicate over a network using specific physical layer (OSI layer 1) and data link layer (OSI layer 2) standards (e.g., Ethernet, Wi-Fi, Token Ring, etc.). Each of NICs 129A-129N is associated with a unique media access control (MAC) address, which may be stored in a memory of the NIC 129-133.

The host machine 102 may run an operating system (not shown). The system 100 may additionally include a server (e.g., a web server), a database and/or database management system (DBMS), and/or a hypervisor 104. The hypervisor may emulate one or more virtual machines 110. Each of the VMs 110 may emulate a physical computing device and configured with networking capabilities. Thus, host machine 102 may be configured to manage many connections to other devices over network 116 on behalf of VMs 110. Accordingly, in order to provide the sufficient bandwidth, the host machine may have multiple NICs 129A-129N to handle the large bandwidth usage.

In order to efficiently use the multiple NICs 129A-129N for transmitting network packet to the external physical network 116 and network devices (e.g., switches 140, 141) in network 116, the system 100 may configure one or more link-layer link aggregations from some or all of these NICs 129A-129N. For example, communication ports of the host machine associated with NICs 129A and 129B may both be coupled to switch 140 as a single logical network connection, resulting in a link aggregation (LA) that provides higher bandwidth (and load balance) than any single one of NICs 129A or 129B can provide. Similarly, the communication port of the computing device associated with NIC 129N may be bonded to switch 141, and switches 140, 141 may form a single logical connection, wherein only one of switches 140, 141 may be active at a given time. This single logical connection associated with two parallel switches 140, 141 may result in a high availability (HA) network packet transmission, thus providing load balance and fault tolerance to failures by any one of the switches 140, 141. In one implementation, links (such as NICs 129A-129N) and networking devices (such as switches 140, 141) may have been pre-configured with LA/HA transmission modes. For example, links 129A, 129B may have been pre-configured to form a logical connection to switch 140 for link aggregation. The configuration data for LA/HA transmission modes may have been stored in a NIC mode table loaded in memory 128 that is accessible by network virtualization layer 108. In another implementation, probe packets, such as link aggregation control protocol (LACP) network packets, may be used to establish LA/HA transmission mode for links and networking devices during a network structure exploring period prior to the transmission of network packets between VMs 110 and NICs 129A-129N. The network virtualization layer 108 may then transmit network packets to these links after the establishment of the link aggregation and/or high availability modes between links and networking devices.

In some implementations, hypervisor 104 can be any one of different hypervisor solutions including, for example, kernel-based virtual machine (KVM), lguest, and user-mode Linux. In some implementations, the guest operating systems of VMs 110 may work collaboratively with hypervisor 104 to make the device emulation more efficiently. In one implementation, hypervisor 104 may be implemented with backend drivers 114 to enable the emulation of particular devices, and the guest operating system of VMs 110 may be implemented with front-end drivers 112 to communicate with backend drivers 114. The hardware component emulation may happen in user space using a software emulator such as, for example, QEMU, Xen, VirtualBox etc. For example, to provide networking capabilities to VMs 110, NICs 129A-129N may be emulated and provided to VMs 110 as vNICs (not shown) to allow VMs 110 to access network 116.

However, to achieve LA/HA capabilities via hardware component emulation such as using vNICs that emulates NICs 129A-129N, a system administrator needs to know the configurations (such as device parameters) in order to configure LA/HA capabilities for VMs 110.

Instead of emulating each of the networking devices, implementations of the present disclosure provide a network virtualization layer 108 that encapsulates the particular configurations of hardware components and allows the provision of LA/HA services without the need for knowing device parameters for network devices (e.g., switches 140, 141). Common device parameters that the system administrators need to configure may include, for example, a router interface, Internet protocol (IP) address of the router, etc.

Instead of configuring and administrating each of the networking devices and LA/HA solutions individually, implementations of the present disclosure may provide network virtualization layer 108 which encapsulates the particular configurations of the network devices and LA/HA solutions, and allows the provision of LA/HA services without the need for managing them each separately (e.g., by performing: selecting a LA solution between the possible ones provided by the hypervisor 104, installing the selected solution in the hypervisor 104, configuring the solution properly, and integrating with the virtual solution). The parameters in the present disclosure are related to the networking structure, rather than the device parameters of each networking device. For example, at networking pre-configuration stage, different profiles may be created for LA and/or HA to be applied to each new VM created by hypervisor 104. Each of the profiles may include the links that the VM may use for LA and/or HA services. In this way, the LA and/or HA capabilities are created at the VM initiation and can be re-used subsequently. As shown in FIG. 1A, network virtualization layer 108 may be part of hypervisor 104 (e.g., KVM or lguest) that directly communicates with backend device drivers 114. Network virtualization layer 108 does not emulate the lowest level communications between backend drivers 114 and hardware components (e.g., NICs 129A-129N). This system is agnostic in the sense that it could run on different host machines (hardware) because hypervisor 104 leverages operating system drivers and APIs to use the underlying hardware.

During operation, VMs 110 may transmit network packets (NPs) between front-end drivers 112 of VMs and backend drivers 114 of hypervisors 104. The front-end drivers 112 and backend drivers 114 are software components or layers that are implemented to provide a standardized communication interface between VMs and virtual devices emulated in hypervisor 104. The guest operating systems (Guests A-N) are aware that they are running under a hypervisor and include front-end drivers 112. Hypervisor 104 is implemented with the backend drivers 114 for each of the virtual devices (e.g., virtual networking devices). A network packet (NP) is a formatted data unit that includes control information and user data (referred to as the payload). The control information may include data relating to how to deliver the payload, including, for example, source and destination network addresses, error detection codes, and sequencing information (i.e., information relating to the order of network packets). The control information may be stored in the header (or trailer) of the network packet. In one implementation, network virtualization layer 108 may associate the network packets with certain metadata. The metadata may include, for example, an identifier associated with the host machine, an identifier associated with a physical port coupled to a network interface controller of the host machine, an identifier of a LA/HA capability associated with the physical port, and an identifier of the transmission mode (LA, HA, or LA/HA mode). The metadata may also include an identifier of the ingress virtual port via which the network packet is received, a priority associated with the ingress virtual port, and a timestamp indicating a time when the network packet is received from the ingress port. Thus, the metadata contains information relating the transmission of the network packets but is not itself part of the network packets. The network virtualization layer 108 may further include a LA/HA decision layer. The metadata may be generated for each network packet received from backend drivers 114 to be transmitted to NICs 128A-128N, or for each network packet received from NICs 128A-128N to be transmitted to VMs 110. The LA/HA decision layer may determine the transmission mode (LA, HA, or LA/HA) based on the metadata associated with the network packets.

In one implementation of the present disclosure, the network packet may have been labeled according to a link aggregation control protocol (LACP) (e.g., IEEE 802.3) at their creation. These LACP network packets may be used to explore the network structure as described below. For example, LACP parameters (such as an identifier associated with the host machine, an identifier associated with a physical port coupled to a network interface controller of the host machine, an identifier of a LA/HA capability associated with the physical port, and an identifier associated with a transmission mode (LA, HA, or LA/HA mode) may be stored as part of the control information of a network packet. In another implementation, the network packets are not labeled according to LACP. These network packets may be routed by the network virtualization layer 108 to the appropriate LA and/or HA links as described below.

The LACP may be used to control the bundling of several ports together to form a single logical channel. The LACP may include data relating to a maximum number of bundled links assigned to single logical network connection in the LA mode. Network devices implemented with LACP (referred to as LACP-enabled network devices) may negotiate a bundling of links by sending LACP packets to peers that are also LACP-enabled. For example, during a LACP detection period, LACP network packets may be transmitted according to a schedule (e.g., every second or every thirty seconds) to detect LACP-enabled links and use detected links for the logical network connection to create a link aggregation. Thus, network virtualization layer 108 may send out LACP network packets to NICs of the host machine to enable LA/HA services prior to transmitting network packets to physical network 116. Network virtualization layer 108 may then transmit the network packet without the need to emulate each of network devices associated with host machine 102.

In another implementation, network virtualization layer 108 may determine where and when to send a network packet based on the metadata associated with the network packet. For example, the network packet may be send to NICs that have been enabled with LA and/or HA capabilities by pre-configuration (e.g., by a system administrator using LA/HA profiles).

Figure 1B:
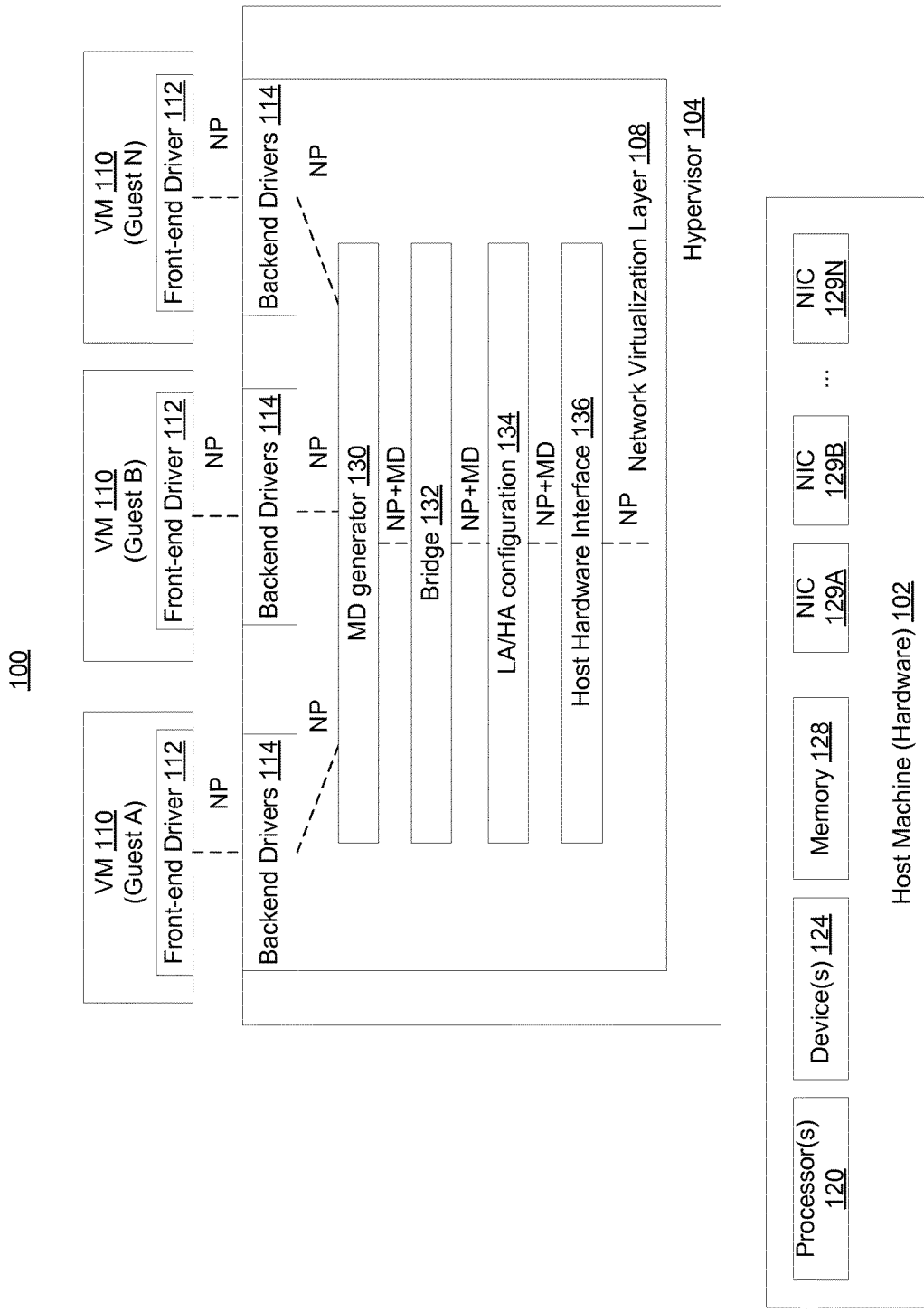
FIG. 1B is a block diagram that illustrates the system in details according to an implementation of the present disclosure.

FIG. 1B is a block diagram that illustrates a system 100 in more details according to an implementation of the present disclosure. As shown in FIG. 1B, network virtualization layer 108 may further include components of a metadata generator 130, a virtual bridge 132, a link aggregation/high availability (LA/HA) decision layer 134, and a host hardware interface 136. These components of network virtualization layer 108 may be implemented in software that may be interfaced with hardware. Backend drivers 114 of hypervisor 104 may exchange network packets (NPs) with front-end drivers 112 associated with VMs 110. As discussed above, network packets may contain control information and payload.

In one implementation, metadata generator 130 may be a software component (as part of network virtualization layer 108 of hypervisor 104) that is to examine each of incoming network packets received from backend drivers 114 and generate certain metadata (MD) associated with these network packets. Metadata may be a dynamic data structure with additional implementation specific information about the network packets. The metadata may be used internally by networking virtualization layer 108 to make decisions regarding whether a network packet should be routed to LA and/or HA-enabled links. The metadata may include certain information about the network packet. The information may be ingress port identifier to identify the virtual port that originates the network packet, the priority associated for the network packets from the virtual port, and a time policy that specifies when (e.g., a specific time period during the day) the network packet can be transmitted to the external physical network 116 etc. For example, if the packet is received during the business hours, the internal priority recorded in the metadata is high with HA, otherwise is low with LA. The priority values may affect the network packet processing inside 108 accordingly. The metadata may be dynamic (or change) in the sense that it changes as the packet gets processed through the subcomponents (e.g., metadata generator 130, virtual bridge 132) within the network virtualization layer 108.

The metadata is an intermediate data structure in the sense that it is used within network virtualization layer 108 to assist making decisions relating to how to bundle different ports associated with bridge 132 to provide LA/HA services for network packets transmitted from VMs 110 to external network 116. In one implementation, all metadata are discarded (e.g., deleted) when network packets exit network virtualization layer 108, so that the metadata is internal to network virtualization layer 108 that is not visible from outside of network virtualization layer 108.

In certain implementations of operating systems (e.g., Linux), the kernel associates a data structure called "memory descriptor" with an address space of a process. The memory descriptor (e.g., mm_struct) includes the start and end of memory segments, the number of physical memory pages used by the process, the amount of virtual address space used, and other information related to the process. In one implementation, the metadata may be recorded as part of a memory descriptor associated with the hypervisor 108. For example, metadata generator 130 may create and store the metadata in the memory descriptor, and bridge 132 may further update the metadata stored in the memory descriptor. When the network packet is transmitted by the host hardware interface to the physical network, the metadata may be removed from the memory descriptor. Thus, the memory descriptor co-exists with the hypervisor 104. The metadata may be added as one of the subfields to the memory descriptor. In one implementation, the metadata may take the format of type-length-value (TLV), whereas the type may be a binary code indicating the kind of field that the metadata represents, the length may be size of the value field (e.g., in bytes), and the value may contain the content data. For example, a metadata may include a transmission mode identifier (LA), a length (64 bits), and port identifier (link1) in the form of {LA, 64 bits, link1} indicating that the network packet associated with this metadata is to be transmitted in the LA mode to a link1. A metadata may include a transmission mode identifier (HA), a length (64 bits), and port identifier (link33) in the form of {HA, 64 bits, link33} indicating that the network packet associated with this metadata is to be transmitted in the HA mode to a link33. Thus, the output from metadata generator 130 to bridge 132 may include network packets and metadata associated with these network packets.

Figure 2:
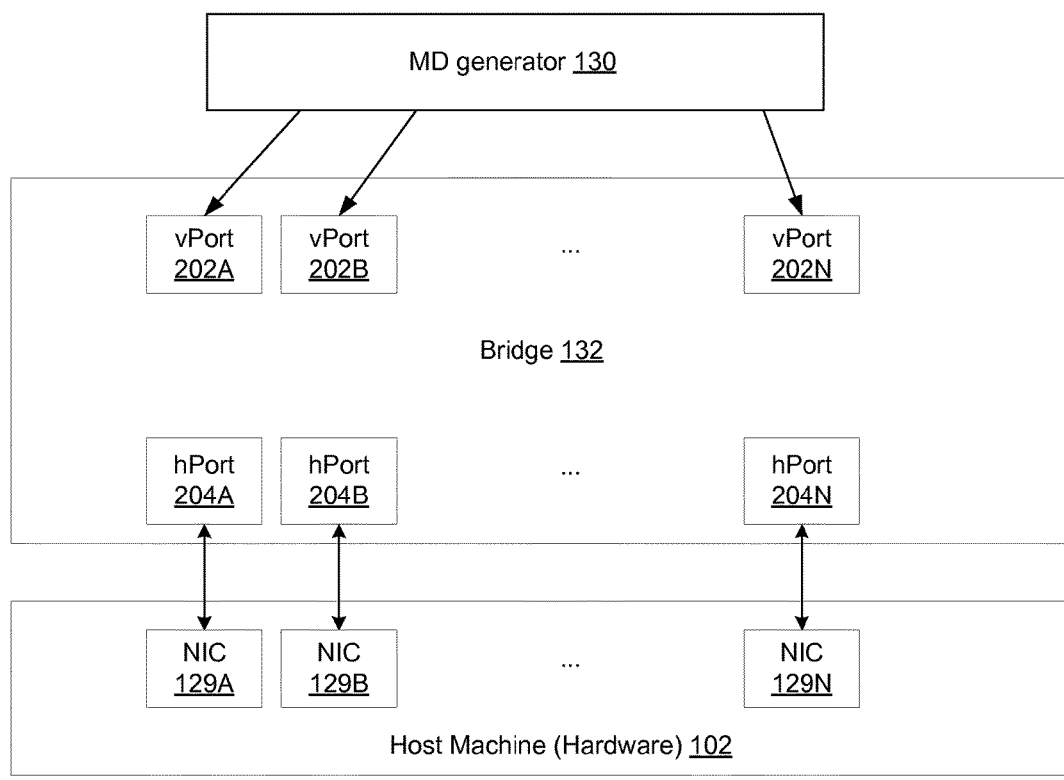
FIG. 2 illustrates a bridge of a network virtualization layer according to an implementation of the present disclosure.

In one implementation, bridge 132 may be a virtual bridge (or virtual switch) that may include virtual ports (vPorts) that may be coupled to VMs 110 and hardware ports (hPorts) that may be coupled to NICs 129A-129N via physical uplink adapters (not shown). Processor(s) 120 may be programmed to implement bridge 132 to cause transmission of network packets among the vPorts and hPorts based on the metadata and network packets. For example, processor(s) 120 may execute the code of the virtual bridge 132 to receive network packets from vPorts and place these network packets on a bus system. The hPorts (such as uplink adaptors) associated with the virtual bridge 132 may receive these network packets from the bus systems and transmit to NICs 129A-129N. FIG. 2 illustrates a bridge 132 in detail according to an implementation of the present disclosure. As shown in FIG. 2, bridge 132 may include vPorts 202A-202N that may be correspondingly coupled to VMs 110 (e.g., from Guests A-N). Each of VMs 110 may communicate network packets via a respective one of vPorts 202A-202N. Bridge 132 may further be associated with hPorts 204A-204N. The hPorts 204A-204N may be hardware ports that are coupled to uplink adapters (e.g., physical Ethernet adapters). These uplink adapters may further connect each of hPorts 204A-204N to a corresponding one of NICs 129A-129N. Thus, bridge 132 may be used to move network packets from a first vPort to a second vPort, or from a vPort to an hPort based on the control information associated with these network packets. For example, bridge 132 may receive network packets and associated metadata from vPort 202A that is coupled to VM 110 (Guest A) and determine that these network packets should be forwarded to hPort 204A based on the source and destination network addresses contained in the control information. Bridge 132 may update the metadata associated with these network packets to indicate the link (such as a NIC) to which the network packets are transmitted for LA/HA services. In another example, bridge 132 may determine that the network packets received from vPort 202A are destined to another vPort (e.g., vPort 209N), and transmit these network packets along with the associated metadata to vPort 209N. These network packets along with the associated metadata may then be transmitted back to the corresponding backend driver 114 and front-end driver 112 associated with Guest N.

In one implementation, the metadata associated with network packets may contain information indicating that these network packets should be transmitted in LA mode and/or HA mode. Referring to FIG. 1B, network virtualization layer 108 may further include a LA/HA decision layer 134 that is to decide the transmission mode for the network packets based on the metadata associate with network packets.

Figure 3:
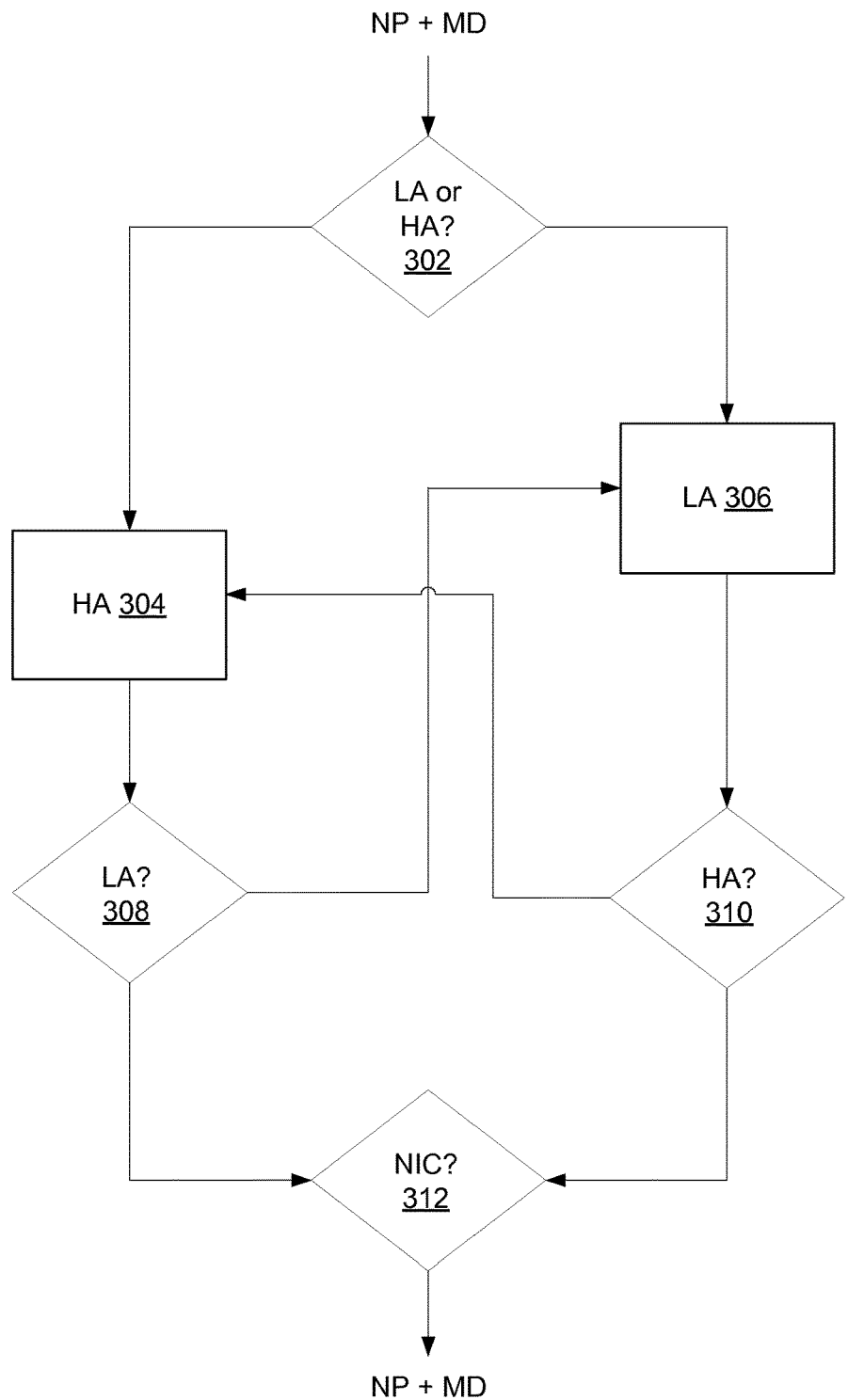
FIG. 3 illustrates a LA/HA decision layer of the network virtualization layer according to an implementation of the present disclosure.

FIG. 3 illustrates a flow diagram to make LA/HA configuration decision by LA/HA decision layer according to an implementation of the present disclosure. A host machine may include one or more network interface controllers (NICs) coupled to an external physical network including network devices. Certain NICs may had previously been configured to receive network packets in the LA mode, HA mode, or LA/HA mode. The transmission modes of NICs may have been stored in a NIC mode table stored in a register accessible by the processor of the host machine. As shown in FIG. 3, LA/HA decision layer 134 may receive network packets and associated metadata. At 302, LA/HA decision layer 134 may determine whether the incoming network packets should be transmitted in LA or HA mode based on the metadata associated with the network packets. If LA/HA decision layer 134 determines that the incoming network packets should be transmitted in the HA mode, at 304, LA/HA decision layer 134 may label these network packets as packets to be transmitted in the HA mode. If LA/HA decision layer 134 determines that the incoming network packets should be transmitted in the LA mode, at 306, LA/HA decision layer 134 may label these network packets as packets to be transmitted in the LA mode. After labeling these network packets to be transmitted in the HA mode, at 308, LA/HA decision layer 134 may further determine whether these network packets should also receive LA services based on the metadata. If they should, at 306, LA/HA decision layer 134 may label these network packets as packets to be transmitted in the LA/HA mode and identify a NIC configured in the LA/HA mode. Similarly, after labeling these network packets to be transmitted in the LA mode, at 310, LA/HA decision layer 134 may further determine whether these network packets should also receive HA services based on the metadata. If they should, at 306, LA/HA decision layer 134 may label these network packets as packets to be transmitted in the LA/HA mode and identify a NIC configured in the LA/HA mode. At 312, LA/HA decision layer 134 may determine a NIC to receive the network packet based on the metadata and transmit these network packets to the NIC of the host hardware interface 136.

In one implementation, host hardware interface 136 may include uplink adapters that couple hPorts 204A-204N associated with bridge 132 to NICs 129A-129N of host machine 102. Host hardware interface 136 may transmit network packets to the NICs identified by the LA/HA decision layer 134 without forwarding the metadata to NICs 129A-129N. In one implementation, the network packets may be transmitted in a termination mode—namely, NICs are bundled according to the LA, HA, or LA/HA mode without the need to further configure the network devices in the external physical network.

In another implementation, the network packet may be transmitted in a transparent mode where the NICs and network devices work collaboratively to establish the transmission under the LA, HA, or LA/HA mode. network packets labeled according to the LACP protocol may be transmitted down to an NIC that is LACP-enabled. If the host machine 102 determines that the network device (e.g., a physical switch in an external physical network) on the other end of the LACP-enabled NIC is also enabled according the LAPC protocol, it may independently send network packets to determine other LACP-enabled NICs that are connected to the LACP-enabled network device. Upon identifying all the LACP-enabled NICs coupled to the LACP-enabled network device, the host machine 102 may create a single logical network connection for these NICs to enable a link aggregation transmission mode. For example, to create the single logical network connection, the host machine 102 may assign a same network address for these NICs and multiplex network packets transmitted to the network address among these NICs.

Figure 4:
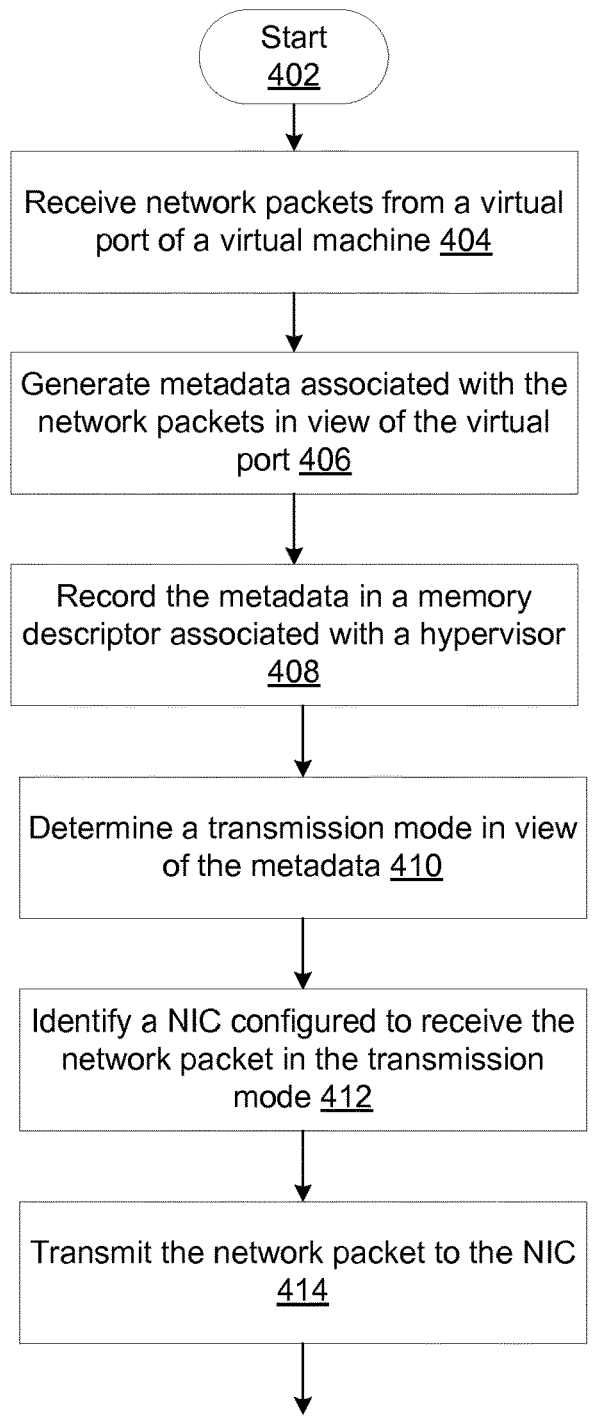
FIG. 4 is a flow diagram illustrating a method to transmit a network packet according to an implementation of the present disclosure.

FIG. 4 is a flow diagram illustrating a method 400 to use a network virtualization layer to configure LA/HA services according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by network virtualization layer as shown in FIG. 1.

Referring to FIG. 4, at 402, the processing device of a host machine may execute a hypervisor to run one or more virtual machines. The hypervisor may include a network virtualization layer coupled between the virtual machines and network interface controllers (NICs) to facilitate the transmission of network packets between the virtual machines and NICs of the host machines to a physical network in LA/HA modes.

At 404, the processing device may receive network packets from a virtual port associated with a virtual machine. The network packet may include control information and payload. The control information may include the source and destination of the payload. The payload includes the data to be transmitted from the source to the destination.

At 406, the processing device may generate a metadata item associated with the network packets based on information associated with the network packet. The metadata item may include an identifier associated with the virtual port from which the network packets are sent out. The metadata item may also include an identifier of the host machine, an identifier of a physical port coupled to the NIC, an identifier of a transmission capability associated with the physical port, or an identifier of the LA/HA transmission mode.

At 408, the processing device may associate the metadata item with a data structure identifying an address space of the hypervisor. In one implementation, the metadata may be recorded as part of the memory descriptor data structure associated with the hypervisor.

At 410, the processing device may determine a transmission mode to transmit the network packet in view of the metadata recorded in the data structure. The transmission mode can be a link aggregation (LA) mode, a high availability (HA) mode, or a combined LA and HA mode.

At 412, the processing device may identify a network interface controller (NIC) of the host machine for processing the network packet in the determined transmission mode. The NIC may be one that has been configured to receive the network packet in the determined transmission mode. For example, the NIC may have been configured according to a link aggregation control protocol (LACP) to receive LACP network packets.

At 414, the processing device may transmit the network packet to the identified NIC to enable a transmission of the network packet to an external physical network in the determined transmission mode.

Figure 5:
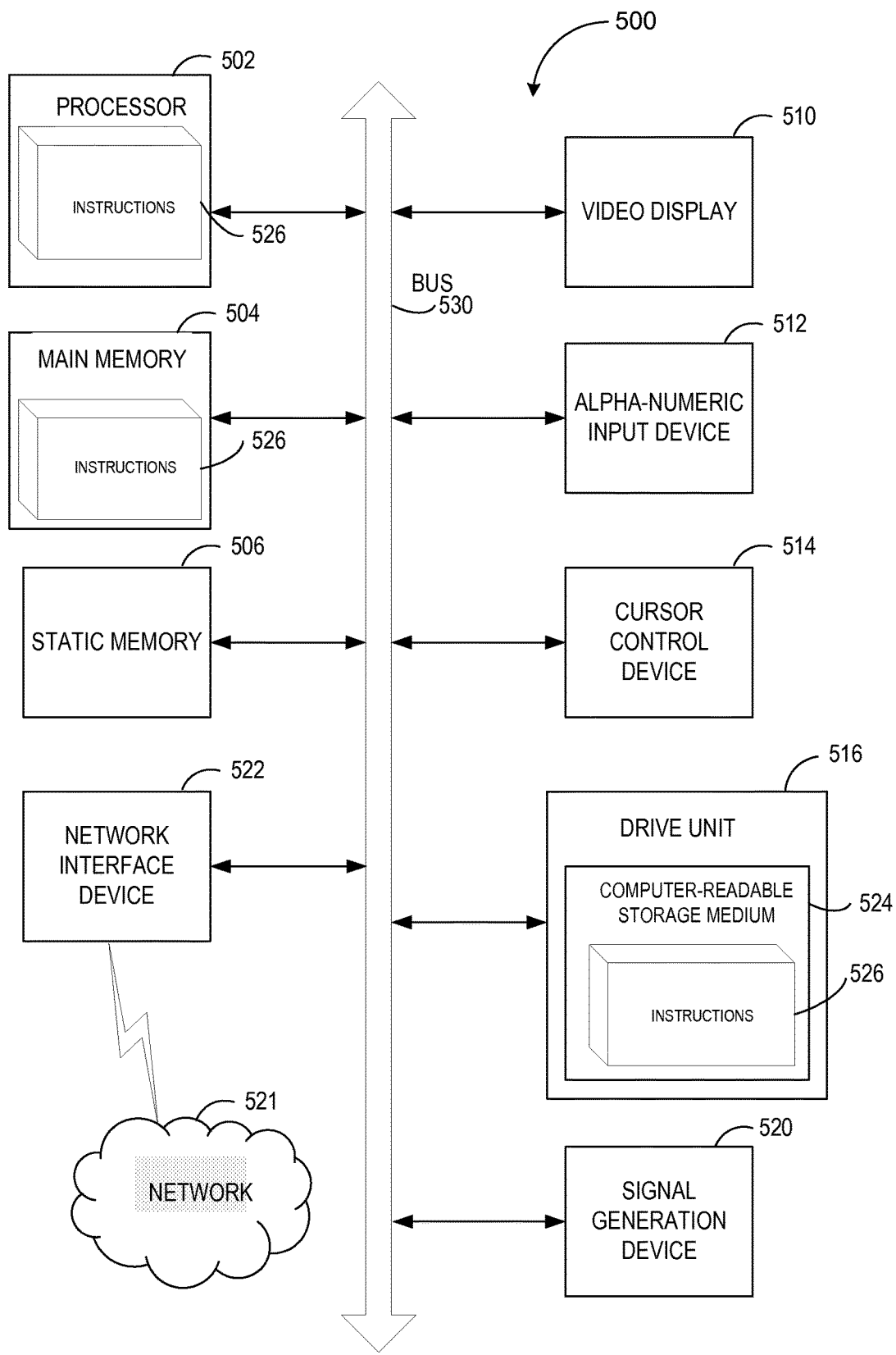
FIG. 5 is a block diagram illustrating an exemplary computer system according to an implementation of the present disclosure.

FIG. 5 illustrates a diagrammatic representation of a machine in the exemplary form of a computer system 500 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., instructions of the routing application 122). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device of a host computer system executing a hypervisor, a network packet from a virtual port associated with a virtual machine managed by the hypervisor;
generating a metadata item associated with the network packet, the metadata item comprising an identifier of the virtual port and an identifier of a transmission mode for the network packet;
recording the metadata item in a data structure identifying an address space of the hypervisor;
determining, by the processing device executing the hypervisor, in view of the identifier of the transmission mode of the metadata item, whether the transmission mode is one of a link aggregation (LA) mode, a high availability (HA) mode, or a combined LA and HA mode;
identifying a network interface controller (NIC) of the host machine for processing the network packet according to the determined transmission mode; and
transmitting the network packet to the NIC according to the determined transmission mode.

2. The method of claim 1, wherein the network packet comprises control information and a payload, and wherein the control information comprises a source network address and a destination network address.

3. The method of claim 1, wherein the hypervisor employs at least one of a virtual bridge to couple the virtual port to a physical port coupled associated with the NIC or a transmission mode decision module to determine the transmission mode in view of the metadata.

4. The method of claim 3, further comprising:
updating the metadata item during routing the network packet from the virtual port to the physical port.

5. The method of claim 1, wherein the metadata further comprises at least one of an identifier of the host machine, an identifier of a physical port coupled to the NIC, an identifier of a transmission capability associated with the physical port, an identifier of the transmission mode, a priority value associated with the virtual port, or a timestamp indicating a time of receiving the network packet from the virtual port.

6. The method of claim 1, further comprising:
determining that the transmission mode comprises the LA mode;
identifying a second NIC of the host machine to receive a second network packet to be transmitted in the LA mode, wherein the NIC and the second NIC are bonded to a logical network connection associated with a physical network device; and transmitting the second network packet to the second NIC.

7. The method of claim 1, further comprising:
determining that the transmission mode comprises the HA mode;
identifying a second NIC of the host machine to receive a second network packet to be transmitted in the HA mode, wherein the NIC and the second NIC are bonded to a logical network connection, and wherein the NIC is connected to a first physical network device associated with the logical network connection and the second NIC is connected to a second physical network device associated with the logical network connection; and transmitting the second network packet to the second NIC.

8. A non-transitory machine-readable storage medium storing instructions which, when executed, cause a processing device to:
receive, by the processing device of a host computer system executing a hypervisor, a network packet from a virtual port associated with a virtual machine managed by the hypervisor;
generate a metadata item associated with the network packet, the metadata item comprising an identifier of the virtual port and an identifier of a transmission mode for the network packet;
record the metadata item in a data structure identifying an address space of the hypervisor;
determine, by the processing device executing the hypervisor, in view of the identifier of the transmission mode of the metadata item, whether the transmission mode is one of a link aggregation (LA) mode, a high availability (HA) mode, or a combined LA and HA mode;
identify a network interface controller (NIC) of the host machine for processing the network packet according to the determined transmission mode; and
transmit the network packet to the NIC according to the determined transmission mode.

9. The non-transitory machine-readable storage medium of claim 8, wherein the network packet comprises control information and a payload, and wherein the control information comprises a source network address and a destination network address.

10. The non-transitory machine-readable storage medium of claim 8, wherein the hypervisor employs at least one of a virtual bridge to couple the virtual port associated with a physical port coupled to the NIC or a transmission mode decision module to determine the transmission mode in view of the metadata.

11. The non-transitory machine-readable storage medium of claim 10, wherein the processing device is further to update the metadata item during routing the network packet from the virtual port to the physical port.

12. The non-transitory machine-readable storage medium of claim 8, wherein the metadata further comprises at least one of an identifier of the host machine, an identifier of a physical port coupled to the NIC, an identifier of a transmission capability associated with the physical port, an identifier of the transmission mode, a priority value associated with the virtual port, or a timestamp indicating a time of receiving the network packet from the virtual port.

13. The non-transitory machine-readable storage medium of claim 8, wherein the processing device is further to:
determine that the transmission mode comprises the LA mode;
identify a second NIC of the host machine to receive a second network packet to be transmitted in the LA mode, wherein the NIC and the second NIC are bonded to a logical network connection associated with a physical network device; and transmit the second network packet to the second NIC.

14. The non-transitory machine-readable storage medium of claim 8, wherein the processing device is further to:
determine that the transmission mode comprises the HA mode;
identify a second NIC of the host machine to receive a second network packet to be transmitted in the HA mode, wherein the NIC and the second NIC are bonded to a logical network connection, and wherein the NIC is connected to a first physical network device associated with the logical network connection and the second NIC is connected to a second physical network device associated with the logical network connection; and transmit the second network packet to the second NIC.

15. A system comprising:
a memory; and
a processing device, operably coupled to the memory, to:
receive, by a hypervisor running on the processing device, a network packet from a virtual port associated with a virtual machine managed by the hypervisor;
generate a metadata item associated with the network packet, the metadata item comprising an identifier of the virtual port and an identifier of a transmission mode for the network packet;
record the metadata item in a data structure identifying an address space of the hypervisor;
determine, by the hypervisor, in view of the identifier of the transmission mode of the metadata item, whether the transmission mode is one of a link aggregation (LA) mode, a high availability (HA) mode, or a combined LA and HA mode;
identify a network interface controller (NIC) of the host machine for processing the network packet according to the determined transmission mode; and
transmit the network packet to the NIC according to the determined transmission mode.

16. The system of claim 15, wherein the network packet comprises control information and a payload, and wherein the control information comprises a source network address and a destination network address.

17. The system of claim 15, wherein the hypervisor employs at least one of a virtual bridge to couple the virtual port associated with a physical port coupled to the NIC or a transmission mode decision module to determine the transmission mode in view of the metadata.

18. The system of claim 15, wherein the metadata further comprises at least one of an identifier of the host machine, an identifier of a physical port coupled to the NIC, an identifier of a transmission capability associated with the physical port, an identifier of the transmission mode, a priority value associated with the virtual port, or a timestamp indicating a time of receiving the network packet from the virtual port.

19. The system of claim 15, wherein the processing device is further to:
determine that the transmission mode comprises the LA mode;
identify a second NIC of the host machine to receive a second network packet to be transmitted in the LA mode, wherein the NIC and the second NIC are bonded to a logical network connection associated with a physical network device; and transmit the second network packet to the second NIC.

20. The system of claim 15, wherein the processing device is further to:
- determine that the transmission mode comprises the HA mode;
- identify a second NIC of the host machine to receive a second network packet to be transmitted in the HA mode, wherein the NIC and the second NIC are bonded to a logical network connection, and wherein the NIC is connected to a first physical network device associated with the logical network connection and the second NIC is connected to a second physical network device associated with the logical network connection; and transmit the second network packet to the second NIC.

* * * * *